United States Patent [19]

Ahsan et al.

[11] Patent Number: 4,966,715

[45] Date of Patent: Oct. 30, 1990

[54] PROCESS FOR THE REMOVAL OF CYANIDE FROM WASTEWATERS

[75] Inventors: M. Quamrul Ahsan, Waldwick; Andrew Griffiths, Ridgewood; Ernest Haug, Ramsey, all of N.J.; Roy Norcross, Norwalk, Conn.

[73] Assignee: Degussa Aktiengesellschaft, Frankfurt am Main, Fed. Rep. of Germany

[21] Appl. No.: 354,039

[22] Filed: May 19, 1989

[51] Int. Cl.$^5$ .......................... C02F 1/52; C02F 1/72
[52] U.S. Cl. .................................. 210/721; 210/724; 210/726; 210/759; 210/904
[58] Field of Search ............... 210/904, 759, 763, 721, 210/724, 738, 726, 717

[56] References Cited

U.S. PATENT DOCUMENTS

| | | | |
|---|---|---|---|
| 3,531,405 | 9/1970 | Zievers et al. | 210/904 |
| 3,617,567 | 11/1971 | Mathre | 210/721 |
| 3,843,516 | 10/1974 | Yamada et al. | 210/904 |
| 4,671,882 | 6/1987 | Douglas et al. | 210/721 |

*Primary Examiner*—Peter Hruskoci
*Assistant Examiner*—Krisanne Shideler
*Attorney, Agent, or Firm*—Beveridge, DeGrandi & Weilacher

[57] ABSTRACT

A process is disclosed for the detoxification of effluents containing cyanide by treating with a mixture of hydrogen peroxide and phosphoric acid.

12 Claims, No Drawings

PROCESS FOR THE REMOVAL OF CYANIDE FROM WASTEWATERS

BACKGROUND AND INTRODUCTION

The present invention relates to a process for the detoxification of effluents containing cyanide and/or other oxidizable substances utilizing a mixture of hydrogen peroxide and phosphoric acid.

Wastewater from a variety of industrial processes pose a serious problem to the environment because of the presence of components in the wastewater that are harmful to the environment. Effluents from a variety of industrial processes often contain cyanide in various forms, such as simple cyanide and cyanide complexed with other toxic metals. The conversion of these toxic substances into non-toxic materials is of paramount importance before such wastewaters are discharged to the waterways in order to avoid serious damage to the environment, the aquatic life, and adverse impact on public health and safety.

A number of methods are currently available for the treatment of cyanide containing effluents. One of the best among the known methods for treating effluents containing cyanide and heavy metals, such as copper, zinc and nickel, involves the oxidation of cyanide contained in the wastewater with hydrogen peroxide. Heavy metals contained in such wastes are usually removed by precipitation as a part of the overall process. The advantage of hydrogen peroxide over other chemical methods of cyanide destruction is that it adds no new substances to the environment except oxygen and water, unlike other processes which cause additional salt formation and the introduction of those salts into natural waterways.

In the case of effluents arising from ore-processing plants, the waste effluent often takes the form of so-called tailings pulp or slurry, wherein the proportion of solid may be 50% or even higher. In treatment of these pulps by hydrogen peroxide, a relatively large amount of hydrogen peroxide is sometimes required for treatment. In such cases, the economic viability of the detoxification process depends on reducing the consumption of treatment chemicals, especially hydrogen peroxide, as far as possible.

Several methods for reducing the amount of hydrogen peroxide are known. U.S. Pat. No. 4,416,786 assigned to the same assignee as the present application, makes use of accurate measurement of oxidizing agent demand and the control of reagent dosage. U.S. patent application No. 07/183,635, assigned to the same assignee as the present application, involves the removal of magnetic materials before the treatment of pulp, since magnetic components have been found to cause catalytic decomposition of $H_2O_2$ and a corresponding increase in consumption.

However, in all of the above processes the consumption of hydrogen peroxide may be too high in many cases involving detoxification of cyanide (simple and metal complexed) in pulps or slurries that contain considerable amounts of solids.

There is, therefore, a need for a process which enables detoxification of cyanide containing effluents, especially a pulp or a slurry containing high amounts of solids, with economically viable amounts of hydrogen peroxide.

SUMMARY OF THE INVENTION

The present invention pertains to a method of treating cyanide contained in wastewater with particularly high levels of solid in the stream. The process involves mixing hydrogen peroxide, in the form of an aqueous solution of a concentration which is between 35% and 90%, preferably at least 50%, and phosphoric acid in the form of a concentrated industrial solution and adding this mixture to the clear wastewater or waste pulp/slurry containing solids.

A wide range of molar ratios between hydrogen peroxide and phosphoric acid may be used. According to the present invention, $H_3PO_4$: $H_2O_2$ molar ratio between 1:60 and 1:3 have been investigated resulting in a substantial reduction in the consumption of hydrogen peroxide when compared to using hydrogen peroxide alone.

DETAILED DESCRIPTION OF THE INVENTION

The present invention pertains to the preparation of an oxidizing agent by mixing hydrogen peroxide at a concentration between 35% and 90%, preferably between 45% and 75%, by weight and phosphoric acid at a concentration of between 30% and 97%, preferably between 80% and 90%, in proportions that correspond to between 0.01 and 0.3 moles of phosphoric acid per mole of hydrogen peroxide, and preferably between 0.05 and 0.1 moles of phosphoric acid per mole of hydrogen peroxide, and includes but is not confined to the use of this mixture to oxidize contaminants in wastewater.

One embodiment of the present invention is carried out with the following steps for continuous treatment of wastewater containing cyanide and other contaminants arising from an ore-processing operation:

1. The effluent from an ore processing operation typically containing one or more heavy metals and cyanide, which may be a pulp or a slurry with up to 60% solid content, is allowed to flow through one or more detoxification tanks, each equipped with a propeller-type stirrer to agitate the effluent. The tanks are chosen in size and number to provide sufficient reaction time for the oxidation of contaminants which is typically between 5 minutes and 2 hours.

2. Aqueous hydrogen peroxide, at a concentration of between 35% and 90%, preferably between 45% and 75% by weight, and phosphoric acid, at a concentration between 50% and 90%, preferably between 80% and 85% by weight, are mixed together before introduction to and contact with the waste effluent. This mixing of reactants can be accomplished in a number of ways.

For example: (a) the reagent may be premixed in a fixed ratio and the mixture is pumped directly into the detoxification tank at a set flow rate and (b) the reagents may be mixed immediately before introduction to and contact with the waste effluent. According to this mode of mixing, the hydrogen peroxide and phosphoric acid can be dosed in fixed proportions into a relatively small vessel with agitator, located at a point near the surface of the effluent in the first detoxification tank. As more liquid is pumped or allowed to flow into the small vessel, the mixture overflows into the detoxification tank.

Lime slurry or sodium hydroxide solution (preferably sodium hydroxide) is added to the effluent in order to maintain the pH between 9 and 12, preferably between 9.5 and 11.5. After oxidation of the cyanide and other oxidizable pollutants have been satisfactorily completed, further steps may be carried out in order to further purify the effluent. Such steps include, but are not limited to, the addition of copper (II) salts to precipitate ferrocyanide ions, or iron (III) salts to precipitate arsenic.

The reaction between the oxidizing mixture of $H_3PO_4$ and $H_2O_2$ with the cyanide may be accelerated by the addition of a catalyst, such as a soluble copper (II) salt, especially copper (II) sulfate pentahydrate, in an amount which yields a concentration of dissolved copper ion in the effluent between 5 and 500 parts per million.

In another embodiment of the present invention, the detoxification may be carried out in a batch mode. Such a method is suitable in cases where smaller quantities of cyanide containing effluent are produced as, for example, from steel hardening shops or electroplating operations.

EXPERIMENTAL DETAILS

Preparation of Reagent

Several batches of mixtures of phosphoric acid (87% aqueous solution) and hydrogen peroxide (50% aqueous solution) were prepared by adding calculated volumes of both these reagents to a flask and stirring for 10–15 minutes. The mixing was carried out at ambient temperature. Table 1 shows the volumes of these reagents used and corresponding molar ratios of $H_3PO_4$ and $H_2O_2$.

DETOXIFICATION TEST

Each detoxification test was performed on 1 kg of pulp sample in a polyethylene container equipped with a stirrer for continuous stirring. A definite volume of the mixtures (as described above) was introduced into the pulp and stirred for 20 minutes. All experiments were carried out at room temperature and the pH of the pulp was carefully monitored during the period of reaction. A portion of the sample was then removed, filtered and the residual cyanide content was determined using a spectrophometric method known as Picric acid method for cyanide analysis.

The invention is illustrated by the following examples.

EXAMPLES:

An ore processing effluent generated from a gold bearing ore from Alaska was treated according to the present invention and by hydrogen peroxide alone. The effluent was in the form of a slurry containing 50% solids by weight. The effluent contained 1150 ppm of cyanide in the form of free cyanide and cyanide complexes of zinc and copper. Table 2 contains a summary of the examples described here.

In Example 1, 1 kg of the above effluent was treated with 45.0 ml of 50% $H_2O_2$ alone and the final treated effluent contained a cyanide concentration of 13.5 ppm. In Example 2, 1 kg of the same effluent was treated with 14 ml of mixture G (Table 1), containing 10.0 ml of 50% $H_2O_2$ and 4.0 ml of 85% $H_3PO_4$. The treated effluent in Example 2 contained a cyanide concentration of only 1.3 ppm of cyanide. The mixture G (Table 1), therefore, resulted in a decrease of $H_2O_2$ consumption by 78%, at the same time producing a much better quality effluent (only 1.3 ppm CN compared to 13.5 ppm CN).

Examples 3 through 16 describe tests that were performed on an effluent sample in the form of a pulp with 50% solids received from a gold mine in British Columbia, Canada. The effluent contained 664 ppm of cyanide in the form of free cyanide and cyanide complexes of zinc and copper. Mixtures prepared with various molar ratios as summarized in Table 1, were used in different amounts as shown in Table 2. Corresponding residual cyanide contents, after 20 minutes reaction time, are also listed in Table 2. All the examples show that mixtures of 85% $H_3PO_4$ and 50% $H_2O_2$ are more efficient in cyanide removal than when equivalent amounts of $H_2O_2$ alone are used.

Examples 3, 4 and 5 show the results of treating 1 kg of pulp with 3.5 ml, 5.0 ml, and 5.7 ml of 50% $H_2O_2$ alone, respectively, resulting in residual cyanide concentrations of 477 ppm, 476 ppm and 451 ppm, respectively. The best result was achieved by using 5.7 ml of 50% $H_2O_2$ alone, resulting in a residual cyanide concentration of 451 ppm, equivalent to 32% cyanide removal. In Example 8, a mixture of $H_3PO_4$ and $H_2O_2$ with molar ratio of 1:60 (mixture B, Table 1) is used to treat the same sample of pulp. By using 5.82 ml of the mixture, which contains 5.70 ml of 50% $H_2O_2$ and 0.12 ml 85% $H_3PO_4$, resulted in a residual cyanide value of 320 ppm, which is equivalent to 52% destruction of cyanide from the above sample. Examples 6 and 7 show the results of using the same mixture B, but different amounts per kg of pulp.

Examples 12, 13 and 14 show the results of using a mixture of $H_3PO_4$ and $H_2O_2$ with 1:24 molar ratio (mixture E, Table 1). In Example 14, using 5.99 ml of the mixture E, containing 5.7 ml of 50% $H_2O_2$ and 0.29 ml $H_3PO_4$, resulted in a residual cyanide value of 6.8 ppm, which is equivalent to 99% cyanide removal compared to 32% removal when 5.7 ml of 50% $H_2O_2$ alone is used according to Example 5.

Examples 15 and 16 show the results of using a mixture of $H_3PO_4$ and $H_2O_2$ with 1:20 molar ratio (mixture F, Table 1). Example 16 shows that using 5.293 ml of this mixture which contains 5.0 ml of 50% $H_2O_2$ and 0.293 ml of 85% $H_3PO_4$ results in 100% removal of cyanide, compared to 32% removal when 5.7 ml of 50% $H_2O_2$ alone is used, according to Example 5.

All of the above examples show dramatic improvement in cyanide removal by using mixtures of $H_3PO_4$ and $H_2O_2$ over that obtained by using $H_2O_2$ alone.

Examples 17 through 30 show the results of testwork on a pulp sample from a mine in Nevada. This pulp consisted of 50% solids and contained 356.0 ppm of cyanide in the form of simple cyanide and cyanide complexed with copper and zinc. Examples 17 through 21 show the results of treating 1 kg of pulp with various amounts of 50% $H_2O_2$ alone. Residual cyanide analyses show very little cyanide removal even with a large excess of $H_2O_2$.

Examples 22, 23 and 24 shows the results of using a mixture of $H_3PO_4$ and $H_2O_2$ with molar ratio of 1:60. Example 22 shows virtually complete removal of cyanide with a residual concentration of cyanide less than 0.1 ppm, while in Example 17 using an equivalent amount (15.69 ml) of 50% $H_2O_2$ alone, only about 15% of the cyanide is removed. Similar dramatic improvements in cyanide detoxification are shown in Examples 25 through 30.

TABLE 1

Synthesis of phosphoric acid and hydrogen peroxide mixtures at various molar ratios.

| Designation | Volume of Reagents (ml) | | Calculated molar ratios of $H_3PO_4$ and $H_2O_2$ in the mixtures |
|---|---|---|---|
| | 85% $H_3PO_4$ | 50% $H_2O_2$ | |
| Mixture A | 0.0 | 100.0 | 0:1 |
| Mixture B | 2.0 | 100.0 | 1:60 |
| Mixture C | 3.0 | 100.0 | 1:40 |
| Mixture D | 4.0 | 100.0 | 1:30 |
| Mixture E | 5.0 | 100.0 | 1:24 |
| Mixture F | 6.0 | 100.0 | 1:20 |
| Mixture G | 40.1 | 100.0 | 1:3 |

TABLE 2

Consumption of reagents and results of treatment of effluent samples with hydrogen peroxide alone and with various mixtures of phosphoric acid and hydrogen peroxide

| Examples | Molar ratio of $H_3PO_4$ and $H_2O_2$ | Total volume of mixture used/kg of pulp (ml) | Volume of 85% $H_3PO_4$ in the mixture/kg pulp (ml) | Volume of 50% $H_2O_2$ in the mixture/kg of cyanide (ml) | Concentration of residual (ppm) |
|---|---|---|---|---|---|
| Example 1  | 0:1  | 45.0  | 0.00 | 45.0  | 13.5 |
| Example 2  | 1:3  | 14.0  | 4.0  | 10.0  | 1.3 |
| Example 3  | 0:1  | 3.50  | 0.00 | 3.50  | 477.0 |
| Example 4  | 0:1  | 5.00  | 0.00 | 5.00  | 476.0 |
| Example 5  | 0:1  | 5.70  | 0.00 | 5.70  | 451.0 |
| Example 6  | 1:60 | 3.57  | 0.07 | 3.50  | 399.0 |
| Example 7  | 1:60 | 5.10  | 0.10 | 5.00  | 347.0 |
| Example 8  | 1:60 | 5.82  | 0.12 | 5.70  | 320.0 |
| Example 9  | 1:30 | 3.64  | 0.14 | 3.50  | 237.0 |
| Example 10 | 1:30 | 5.20  | 0.20 | 5.00  | 156.0 |
| Example 11 | 1:30 | 5.93  | 0.23 | 5.70  | 148.0 |
| Example 12 | 1:24 | 3.68  | 0.18 | 3.50  | 198.0 |
| Example 13 | 1:24 | 5.25  | 0.25 | 5.00  | 139.0 |
| Example 14 | 1:24 | 5.99  | 0.29 | 5.70  | 6.8 |
| Example 15 | 1:20 | 3.71  | 0.21 | 3.50  | 162.0 |
| Example 16 | 1:20 | 5.29  | 0.29 | 5.00  | <0.1 |
| Example 17 | 0:1  | 15.69 | 0.00 | 15.69 | 302.0 |
| Example 18 | 0:1  | 15.00 | 0.00 | 15.00 | 350.0 |
| Example 19 | 0:1  | 13.00 | 0.00 | 13.00 | 350.0 |
| Example 20 | 0:1  | 9.00  | 0.00 | 9.00  | 350.0 |
| Example 21 | 0:1  | 7.00  | 0.00 | 7.00  | 350.0 |
| Example 22 | 1:60 | 16.00 | 0.31 | 15.69 | <0.1 |
| Example 23 | 1:60 | 15.30 | 0.30 | 15.00 | 78.4 |
| Example 24 | 1:60 | 7.14  | 0.14 | 7.00  | 161.0 |
| Example 25 | 1:40 | 13.39 | 0.39 | 13.00 | 0.1 |
| Example 26 | 1:40 | 9.27  | 0.27 | 9.00  | 3.4 |
| Example 27 | 1:40 | 7.21  | 0.21 | 7.00  | 161.0 |
| Example 28 | 1:24 | 13.64 | 0.64 | 13.00 | 0.1 |
| Example 29 | 1:24 | 9.45  | 0.45 | 9.00  | 5.0 |
| Example 30 | 1:24 | 7.35  | 0.35 | 7.00  | 105.0 |

In some cases, the presence of phosphate in wastewater is a case for environmental concern. We expect that much of the phosphate arising from the use of phosphoric acid in the present process will be removed during and after the process by precipitation with calcium and ferric ions. In the event that a large excess of residual phosphate is present in the treated effluent, this excess phosphate can be removed by precipitation as calcium phosphate by the addition of lime slurry. Phosphate can be removed even more effectively by the addition of ferric ion (FERRIFLOC e.g. $Fe_2(SO_4)_3$) which will precipitate the phosphate as ferric phosphate.

Further variations and modifications of the foregoing will be apparent to those skilled in the art and are intended to be encompassed by the claims appended hereto.

We claim:

1. A method of treating industrial wastewater containing cyanide for the conversion of cyanide toxic substances into non-toxic materials comprising adding to wastewater an oxidizing agent consisting essentially of a source of hydrogen peroxide and phosphoric acid with a molar ratio of phosphoric acid to hydrogen peroxide between 1:60 and 1:3 in a sufficient amount to oxidize said cyanide in the wastewater.

2. A method as claimed in claim 1 wherein the source of hydrogen peroxide is hydrogen peroxide having a concentration between 35% and 90%.

3. A method according to claim 2 wherein the hydrogen peroxide is mixed with phosphoric acid and the mixture is pumped directly into the cyanide containing wastewater at a desired flow rate.

4. The method according to claim 2 wherein the hydrogen peroxide and the phosphoric acid are mixed immediately before introduction to and contact with the wastewater.

5. The method according to claim 2 wherein the concentration of hydrogen peroxide is at least 50%.

6. The method according to claim 1 wherein the source of phosphoric acid is at a concentration between 30 and 97%.

7. The method according to claim 6 wherein the concentration of phosphoric acid is between 80 and 90%.

8. The method according to claim 1 wherein the molar ratio is between 0.01 and 0.3 moles of phosphoric acid per mole of hydrogen peroxide.

9. The method according to claim 8 wherein the molar ratio is between 0.05 and 0.01 moles of phosphoric acid per mole of hydrogen peroxide.

10. The method according to claim 1 wherein the cyanide containing wastewater contains up to 60% solids content.

11. The method according to claim 1 wherein any excess phosphate from the phosphoric acid is removed by treating with calcium hydroxide for precipitation.

12. The method according to claim 1 wherein any excess phosphate for the phosphoric acid is removed by adding ferric ion to precipitate the phosphate as ferric phosphate.

* * * * *